United States Patent
Boes et al.

[11] Patent Number: 6,132,837
[45] Date of Patent: Oct. 17, 2000

[54] VACUUM INSULATION PANEL AND METHOD OF PREPARING THE SAME

[75] Inventors: R. Ulrich Boes, Neu Isenburg, Germany; Kevin Roderick; Douglas M. Smith, both of Albuquerque, N. Mex.

[73] Assignee: Cabot Corporation, Boston, Mass.

[21] Appl. No.: 09/164,506

[22] Filed: Sep. 30, 1998

[51] Int. Cl.[7] ................................................ B32B 1/06
[52] U.S. Cl. ........................ 428/69; 428/76; 156/286; 52/404.1
[58] Field of Search .................. 428/69, 76; 220/421; 156/286; 52/404.1

[56] References Cited

U.S. PATENT DOCUMENTS

| | | |
|---|---|---|
| 3,004,877 | 10/1961 | Simms et al. . |
| 3,162,566 | 12/1964 | Katz . |
| 3,167,159 | 1/1965 | Bovenkerk . |
| 4,159,359 | 6/1979 | Pelloux-Gervais et al. . |
| 4,668,551 | 5/1987 | Kawasaki et al. . |
| 4,680,070 | 7/1987 | Hughes . |
| 5,032,439 | 7/1991 | Glicksman et al. .............. 428/69 |
| 5,076,984 | 12/1991 | Bisplinghoff et al. . |
| 5,084,320 | 1/1992 | Barito et al. . |
| 5,094,899 | 3/1992 | Rusek, Jr. ......................... 428/69 |
| 5,211,785 | 5/1993 | Hughes . |
| 5,252,408 | 10/1993 | Bridges et al. . |
| 5,316,816 | 5/1994 | Sextl et al. . |
| 5,362,541 | 11/1994 | Sextl et al. . |
| 5,376,449 | 12/1994 | Harris et al. . |
| 5,389,420 | 2/1995 | Sextl et al. . |
| 5,480,696 | 1/1996 | Harris et al. . |
| 5,512,345 | 4/1996 | Tsutsumi et al. . |
| 5,527,411 | 6/1996 | Jutte . |
| 5,756,179 | 5/1998 | Jutte . |

FOREIGN PATENT DOCUMENTS

| | | |
|---|---|---|
| 0 682 206 | 11/1995 | European Pat. Off. . |
| 0 892 120 | 1/1999 | European Pat. Off. . |
| 41 06 727 | 11/1995 | Germany . |

Primary Examiner—Alexander Thomas

[57] ABSTRACT

A method of preparing a vacuum insulation panel is disclosed. In the method of the present invention, a plurality of metal oxide-containing compacts, each of which contains less water than the amount of water contained therein at atmospheric equilibrium, are enclosed in a film that retards the passage of moisture therethrough. The film is breached and the metal oxide-containing compacts are positioned in an air-impermeable container at atmospheric pressure. The pressure is reduced in the air-impermeable container, and the air-impermeable container is sealed to form the vacuum insulation panel. Also disclosed is a vacuum insulation panel comprising a plurality of metal oxide-containing compacts disposed in an air-impermeable container, wherein the metal oxide-containing compacts contain less water than the amount of water contained therein at atmospheric equilibrium.

26 Claims, 1 Drawing Sheet

VACUUM INSULATION PANEL AND METHOD OF PREPARING THE SAME

TECHNICAL FIELD OF THE INVENTION

The present invention relates generally to vacuum insulation panels and methods of preparing the same.

BACKGROUND OF THE INVENTION

It has long been known that a vacuum is a good insulator. Accordingly, vacuum insulation panels are utilized in a variety of insulation environments, especially those applications which demand enhanced thermal performance in a limited space. By way of example, refrigerator manufacturers increasingly are using vacuum insulation panels to insulate refrigerators in view of the more stringent energy standards in the U.S. and abroad that now must be met.

Typically, vacuum insulation panels include powders or granules of a low-density material such as silica. Under conventional methods of making the panels, the low-density powder is dried and placed into a porous inner bag or container. Pressure is applied to the powder-containing inner bag in order to compact the powder into a rigid board. The compacted inner board is then inserted into an impermeable outer envelope which is evacuated to a desired pressure to form a vacuum therein and sealed.

A significant problem with conventional approaches for making the vacuum insulation panels is that it has proven to be very cumbersome and relatively expensive to prepare and configure the panels for the specifications of each commercial end product (e.g., refrigerators) in which the panels are used. In this respect, even different products of the same type, such as refrigerators, require a large number of quite diverse panel sizes and shapes. In particular, two different general approaches have been attempted for satisfying the many different panel configurations required for different end products. In a first approach, the panels are produced and supplied from a single panel producing facility. This first approach, however, suffers from very high distribution and inventory expenses associated with accommodating the vast diversity in panel sizes and shapes required for different manufacturers. For example, equipment used to prepare the panels usually must be re-configured every time panels for a different product are prepared.

A second approach entails production of the panels directly at the end product (e.g., refrigerator) manufacturing sites. This second approach has also been unsatisfactory because of the difficulty in transporting large volumes of the low-density powders or granules (e.g., silica). In addition, the end product manufacturers are generally ill-equipped to handle and process the powder, nor do many manufacturers want to take on this added burden.

From the foregoing, it will be appreciated that there is a need for a vacuum insulation panel and a method of preparing the same in which a broad range of differently shaped and sized panels can be prepared with relative ease, even by the end product (e.g., refrigerator) manufacturers. It is an object of the present invention to provide such a vacuum insulation panel and a method of preparing the same.

BRIEF SUMMARY OF THE INVENTION

The present invention provides a method of preparing a vacuum insulation panel comprising providing a plurality of metal oxide-containing compacts, each enclosed in a film that retards the passage of moisture therethrough, wherein the metal oxide-containing compacts contain less water than the amount of water contained therein at atmospheric equilibrium. The film is breached and the metal oxide-containing compacts are positioned in an air-impermeable container at atmospheric pressure. The pressure in the air-impermeable container is reduced, and the air-impermeable container is sealed to form the vacuum insulation panel. The present invention also provides a vacuum insulation panel comprising an air-impermeable container and disposed therein a plurality of metal oxide-containing compacts, wherein the metal oxide-containing compacts contain less water than the amount of water contained therein at atmospheric equilibrium. Other advantages of the present invention, as well as additional inventive features, will be apparent from the description of the invention provided herein, in conjunction with the accompanying drawings.

DESCRIPTION OF THE PREFERRED EMBODIMENTS

Figure 1:
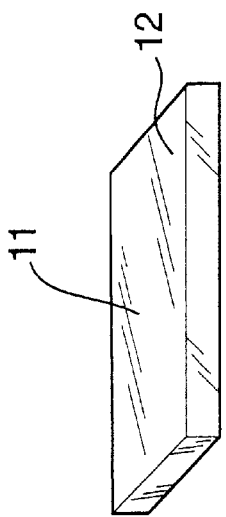
FIG. 1 illustrates a perspective view of a metal oxide-containing compact, in accordance with the present invention.

The present invention is predicated, at least in part, on facilitating the production of vacuum insulation panels so that such panels can be produced with relative ease in any configuration and having any suitable dimensions. In particular, the present invention permits vacuum insulation panels to be produced in a versatile manner that allows the panels to be prepared readily in the dimensions and configuration required by any particular end products, such as, for example, refrigerators. Strictly by way of example, the present invention enables manufacturers of the end products (e.g., refrigerators) to complete the vacuum insulation panels in any desired dimensions compatible with each manufacturer's own end product(s), even on site at each manufacturing facility. Alternatively, the vacuum insulation panels can be prepared centrally at a vacuum insulation panel manufacturing site from which the completed panels are shipped to each manufacturer, if desired.

In particular, the present invention provides a vacuum insulation panel and method of preparing the same in which a plurality (i.e., at least two, and possibly several or more) of metal oxide-containing compacts are made in the form of inserts that are positioned in an air-impermeable container. The air-impermeable container is then evacuated to a desired pressure and then sealed to complete the vacuum insulation panel.

The metal oxide-containing compacts are generally made by applying pressure to a metal oxide-containing composition, usually in powder or granular form. The metal oxide can have any suitable physical characteristics such as primary particle size (e.g., 1–500 $\mu m$), aggregate particle size, and surface area (e.g., 1–1000 $\mu m^2/g$). The metal oxide is preferably silica, although other metal oxides, such as, for example, titania, alumina, and the like, as well as combinations of metal oxides, are encompassed within the scope of the present invention. The metal oxide can also be provided in any of a number of suitable forms. For example, in the case of silica, the metal oxide-containing composition can include fumed silica, silica gel, silica aerogel, precipitated silica, and combinations thereof.

In addition, the metal oxide can be blended or otherwise combined with one or more components to form the metal oxide-containing composition. For example, the metal oxide-containing composition desirably includes an opacifier (e.g., infrared opacifiers), such as, but not limited to, carbon black, titania, and zirconium silicate. Also by way of example, the metal oxide-containing composition can also (or alternatively) include fibers, such as, for example, glass, ceramic, and/or plastic fibers, in order to enhance mechanical strength. When fibers are present, they preferably comprise 10 wt. % or less of the metal oxide-containing composition.

As noted, pressure is applied (e.g., uniaxially or isostatically) to reduce the volume of the metal oxide-containing composition so as to produce the metal oxide-containing compacts. In accordance with the present invention, the metal oxide-containing compacts are rendered relatively dry, i.e., the metal oxide-containing compacts contain less water than the amount of water contained therein at atmospheric equilibrium. In this respect, the metal oxide-containing composition (e.g., in powder form) can be dried, or, alternatively (or in addition), the metal oxide-containing compacts (i.e., after reduction of the volume of the metal oxide-containing composition through the application of pressure) are dried. In any event, the dried metal oxide-containing compacts (containing less water than the amount of water contained therein at atmospheric equilibrium) are enclosed in a film which can be comprised of any suitable material (e.g., a polyolefin, such as polyethylene, or polyvinyl chloride) that inhibits or retards the passage of moisture (e.g., atmospheric water) through the film. Significantly, the metal oxide-containing compacts are desirably enclosed in the film (e.g., "shrink-wrapped") as soon as possible after compaction and drying in order to maintain the integrity of the metal oxide-containing compacts over time and to minimize readsorption of moisture. Preferably, the amount of water contained in the metal oxide-containing compacts is maintained at 3 wt. % or less (e.g., 1–3 wt. %, or less).

The metal oxide-containing compacts can be prepared into any suitable size, shape, and volume. Since the metal oxide-containing compacts are used as inserts in the air-impermeable container, their size, shape, and volume are selected desirably in order to optimize compatibility with differently shaped and sized air-impermeable containers that are designed for use with differently configured end products. In this respect, the metal oxide-containing compacts desirably are formed into relatively smaller sizes and shapes so as to enhance flexibility in matching the vacuum insulation panel size with any particular end product. While the metal oxide-containing compacts can be formed into any suitable general shape, the metal oxide-containing compacts desirably are characterized by a relatively planar, rectangular shape inasmuch as that is the general shape in which most vacuum insulation panels are required. Alternatively, the metal oxide-containing compacts can be formed with beveled edges (e.g., at 45°) and combined to form a cube or box shape. In one aspect of the present invention, for ease and predictability in completing the vacuum insulation panels, the metal oxide-containing compacts desirably have relatively uniform dimensions.

Generally, the length of the metal oxide-containing compacts preferably ranges from about 1 mm to about 500 mm, and more preferably from about 5 mm to about 240 mm. The width of the metal oxide-containing compacts preferably ranges from about 1 mm to about 1000 mm, and more preferably ranges from about 5 mm to about 720 mm. Meanwhile, the height (i.e., thickness) of the metal oxide-containing compacts preferably ranges from about 1 mm to about 100 mm, and more preferably ranges from about 5 mm to about 30 mm.

Advantageously, while wrapped in the film, the metal oxide-containing compacts can be stored prior to completion of the vacuum insulation panels at the same site as where the compaction occurred, or, alternatively, the metal oxide-containing compacts can be shipped to remote locations, such as, for example, the end product manufacturer's facility in order for the vacuum insulation panel to be completed.

After storage and/or shipping, the film which encloses each of the metal oxide-containing compacts is breached so as to form an opening therein, and the metal oxide-containing compacts are positioned as inserts into the air-impermeable container at atmospheric pressure. In this regard, the breaching can be prior to the positioning, or the positioning can be prior to the breaching. The breaching of the film is important to ensure that the pressure throughout the air-impermeable container is uniformly reduced (i.e., the metal oxide-containing compact is exposed to the atmosphere or vacuum of the inside of the air-impermeable container), thereby yielding a desirable vacuum insulation panel.

The breaching can be performed in any suitable manner. For example, the breaching can be performed by puncturing the film or even by pulling a tab that triggers tearing or release of the film (as is found in many commercial items). Optionally, the entire film can be removed from the metal oxide-containing compacts and discarded during the breaching step.

The air-impermeable container comprises any suitable air-impermeable material, such as, for example, ethylene vinyl alcohol (EVOH), polyvinylidene chloride (PVDC), polyethylene terephthalate (PET), aluminum foil laminates, and polyvinyl alcohol (PVOH). In some embodiments, the air-impermeable container is laminated and/or metalized. In this respect, the use of a metalized air-impermeable container (e.g., in the form of a metallic layer between two other layers of a laminated air-impermeable container) can be particularly desirable in order reduce the permeability of the air-impermeable container and/or to otherwise enhance the insulation characteristics of the overall vacuum insulation panel. Preferably, the air-impermeable container is puncture resistant (e.g., a laminate having a puncture resistant outer layer).

After breaching the film and positioning the metal oxide-containing compacts in the air-impermeable container, the pressure in the air-impermeable bag is reduced in order to form a vacuum therein. The air-impermeable container then is sealed to form the vacuum insulation panel. Preferably, the pressure in the air-impermeable container is reduced to about 80% or less of the atmospheric pressure at 22° C. (typically 80–110 kPa). In some embodiments, the pressure in the air-impermeable container at 22° C. is not more than 65%, in other embodiments not more than 30%, and in yet other embodiments not more than 10%, of the atmospheric pressure. Accordingly, in some embodiments, the pressure in the air-impermeable container is reduced to about 80 kPa or less, in other embodiments about 10 kPa or less, in yet other embodiments about 4 kPa or less, and even about 2 kPa or less in yet further embodiments. In some instances, it is desirable that the pressure in the air-impermeable container is reduced to about 1 kPa or less.

The following example further illustrates the present invention but, of course, should not be construed as in any way limiting its scope.

EXAMPLE

This example schematically illustrates an exemplary arrangement of a vacuum insulation panel and a method of preparing the same, in accordance with the present invention.

Figure 2:
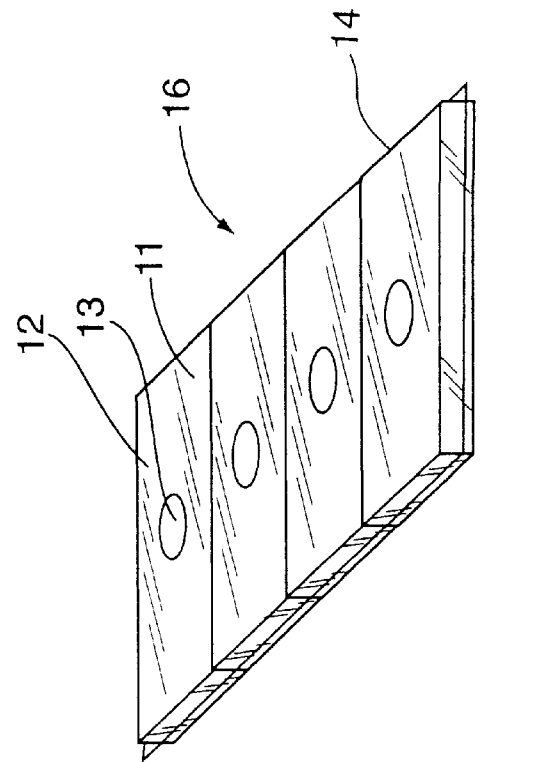
FIG. 2 illustrates a perspective view of four breached metal oxide-containing compacts as disposed in an air-impermeable container having an access opening therein, in accordance with the present invention.
Figure 3:
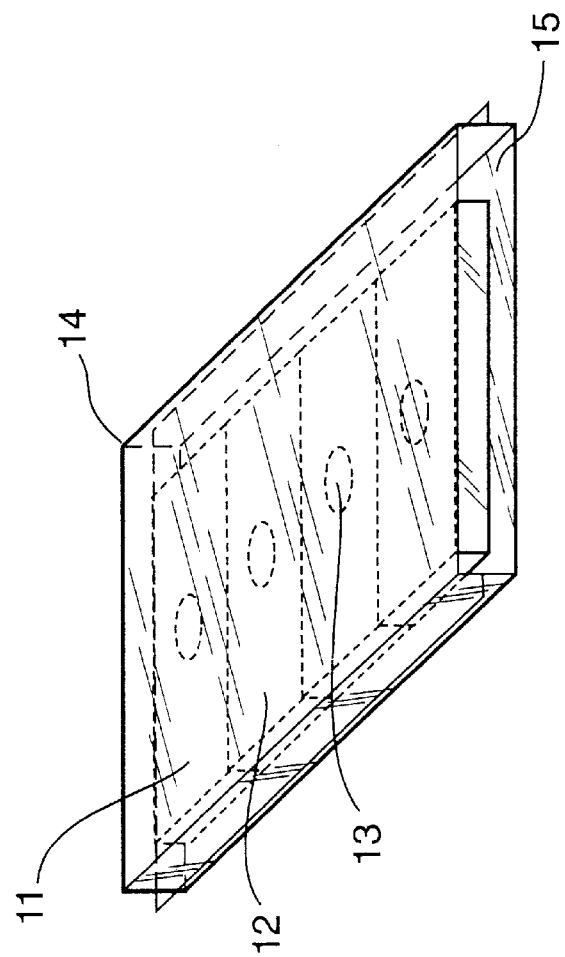
FIG. 3 illustrates a perspective view of four metal oxide-containing compacts disposed in the air-impermeable container, as in FIG. 2, except that a vacuum is drawn in the air-impermeable container and the air-impermeable container is sealed, in accordance with the present invention.

A metal oxide-containing composition is compacted under pressure and dried to form a metal oxide-containing compact 11 as depicted in FIG. 1. The metal oxide-containing compact 11 then is enclosed in a film 12 that retards the passage of moisture therethrough. The metal oxide-containing compact 11 has a height of 25 mm, a length of 180 mm, and a width of 360 mm. Three other such metal oxide-containing compacts are prepared in the same manner. The film 12 of each of the four metal oxide-containing compacts 11 is breached so that an opening 13 is provided in each film 12, as shown in FIG. 2. The four metal oxide-containing compacts 11 are positioned in an air-impermeable container 14 by way of an access opening 15. After breaching the film 12 and positioning the four metal oxide-containing compacts 11 in the air-impermeable container 14, the pressure in the air-impermeable container is reduced to about 80% or less of atmospheric pressure (specifically, to about 80 kPa or less) so as to draw a vacuum in the air impermeable container 14. The air impermeable container 14 is then sealed so as to form a vacuum insulation panel 16, as shown in FIG. 3. Accordingly, this Example illustrates the preparation of the present inventive vacuum insulation panel, and the method of preparing the same, having a height of 25 mm, a length of 720 mm, and a width of 360 mm.

While this invention has been described with an emphasis upon preferred embodiments, it will be obvious to those of ordinary skill in the art that variations of the preferred embodiments may be practiced otherwise than specifically described herein. Accordingly, this invention includes all modifications encompassed within the spirit and scope of the invention as defined by the following claims.

What is claimed is:

1. A method of preparing a vacuum insulation panel comprising (a) providing a plurality of metal oxide-containing compacts, each enclosed in a film that retards the passage of moisture therethrough, wherein said metal oxide-containing compacts contain less water than the amount of water contained therein at atmospheric equilibrium, (b) breaching said film and positioning said metal oxide-containing compacts in an air-impermeable container at atmospheric pressure, (c) reducing the pressure in said air-impermeable container, and (d) sealing said air-impermeable container to form said vacuum insulation panel.

2. The method of claim 1, wherein said breaching of said film is prior to said positioning of said metal oxide-containing compacts in said air-impermeable container.

3. The method of claim 1, wherein said positioning of said metal oxide-containing compacts in said air-impermeable container is prior to said breaching of said film.

4. The method of claim 1, wherein said film is removed from said metal oxide-containing compacts prior to sealing said air-impermeable container.

5. The method of claim 1, wherein said metal oxide is silica.

6. The method of claim 1, wherein said metal oxide-containing compacts comprise fumed silica.

7. The method of claim 1, wherein said metal oxide-containing compacts comprise silica gel.

8. The method of claim 1, wherein said metal oxide-containing compacts comprise silica aerogel.

9. The method of claim 1, wherein said metal oxide-containing compacts comprise precipitated silica.

10. The method of claim 1, wherein said metal oxide-containing compacts comprise an opacifier.

11. The method of claim 1, wherein said film comprises a material selected from the group consisting of a polyolefin, polyvinyl chloride, and combinations thereof.

12. The method of claim 1, wherein said container comprises a material selected from the group consisting of a polyolefin, polyvinyl chloride, and combinations thereof.

13. The method of claim 1, wherein said container is metalized.

14. The method of claim 1, wherein said compacts have a height ranging from about 1 mm to about 100 mm, a width ranging from about 1 mm to about 1000 mm, and a length ranging from about 1 mm to about 500 mm.

15. The method of claim 14, wherein said metal oxide-containing compacts have substantially the same dimensions.

16. The method of claim 1, wherein the pressure in said container at 22° C. is reduced in step (c) to about 80% or less of the atmospheric pressure.

17. The method of claim 1, wherein the pressure in said container at 22° C. is reduced in step (c) to about 80 kPa or less.

18. The method of claim 1, wherein the pressure in said container at 22° C. is reduced in step (c) to about 10 kPa or less.

19. The method of claim 1, wherein the pressure in said container at 22° C. is reduced in step (c) to about 4 kPa or less.

20. The method of claim 1, wherein said step (a) comprises (i) providing a metal oxide-containing composition, (ii) compacting said metal oxide-containing composition to form said metal oxide-containing compacts, (iii) reducing the amount of water in said metal oxide-containing compacts, and (iv) enclosing said compacts in said film.

21. A vacuum insulation panel comprising an air-impermeable container and disposed therein a plurality of metal oxide-containing compacts in breached films that retard the passage of moisture therethrough, wherein said metal oxide-containing compacts contain less water than the amount contained therein at atmospheric equilibrium.

22. The vacuum insulation panel of claim 21, wherein said container comprises a material selected from the group consisting of a polyolefin, polyvinyl chloride, and combinations thereof.

23. The vacuum insulation panel of claim 21, wherein said container is metalized.

24. The vacuum insulation panel of claim 21, wherein said compacts have a height ranging from about 1 mm to about 100 mm, a width ranging from about 1 mm to about 1000 mm, and a length ranging from about 1 mm to about 500 mm.

25. The vacuum insulation panel of claim 21, wherein said metal oxide is silica.

26. The vacuum insulation panel of claim 21, wherein the pressure in said container at 22° C. is about 80 kPa or less.

* * * * *